United States Patent
Bélonožnik

(10) Patent No.: US 6,516,999 B1
(45) Date of Patent: Feb. 11, 2003

(54) METHOD OF PROTECTING DATA STORED IN THE MEMORY DEVICE OF A COMPUTER SYSTEM AND EQUIPMENT TO CARRY OUT THIS METHOD

(75) Inventor: Jaroslav Bélonožnik, Praha (CZ)

(73) Assignee: Solid Access Technologies Limited Liability Company, Newburyport, MA (US)

( * ) Notice: Subject to any disclaimer, the term of this patent is extended or adjusted under 35 U.S.C. 154(b) by 0 days.

(21) Appl. No.: 09/581,076
(22) PCT Filed: Oct. 12, 1999
(86) PCT No.: PCT/CZ99/00036
§ 371 (c)(1), (2), (4) Date: Jul. 27, 2000
(87) PCT Pub. No.: WO00/22497
PCT Pub. Date: Apr. 20, 2000

(30) Foreign Application Priority Data

Oct. 14, 1998 (CZ) ........................... PV 3300-98

(51) Int. Cl.[7] .................................................. G06K 5/00
(52) U.S. Cl. .................. 235/382; 235/379; 235/380; 235/451; 235/492
(58) Field of Search .................. 235/379, 380, 235/382, 451, 492

(56) References Cited

U.S. PATENT DOCUMENTS

| | | | |
|---|---|---|---|
| 4,669,281 A | * 6/1987 | Young | 70/57 |
| 5,187,352 A | * 2/1993 | Blair et al. | 235/382 |
| 5,341,422 A | * 8/1994 | Blackledge, Jr. et al. | 380/4 |
| 5,375,243 A | * 12/1994 | Parzych et al. | 395/725 |
| 5,643,086 A | * 7/1997 | Alcorn et al. | 463/29 |
| 5,651,139 A | * 7/1997 | Cripe et al. | 395/490 |
| 5,657,473 A | 8/1997 | Killean et al. | |
| 5,768,382 A | * 6/1998 | Schneier et al. | 380/23 |
| 5,812,821 A | * 9/1998 | Sugi et al. | 395/500 |
| 5,983,317 A | * 11/1999 | Kanda et al. | 711/112 |
| 6,012,636 A | * 1/2000 | Smith | 235/380 |

* cited by examiner

Primary Examiner—Michael G. Lee
Assistant Examiner—Seung Ho Lee
(74) Attorney, Agent, or Firm—Nath & Associates PLLC; Gary M. Nath; Marvin C. Berkowitz

(57) ABSTRACT

A method of protecting data, stored in a memory device of a computer system connected to a SCSI interface, against, unauthorized access whereby access by the computer system to the memory device is either permitted or refused, depending upon the authorization of a request, by an exchange of information between the computer system and the memory device at the SCSI interface. Authorization is by means of identification of an authorized user. During access by the computer system to the memory device, any kind of operation with the memory device can be blocked, or access permission given for memory readout only, or for readout and recording, or only for recording. The equipment for carrying out the method includes a memory device connected by a SCSI bus to a host computer system, while between the memory device and the host computer system there an additional control unit with authorization block is inserted.

18 Claims, 1 Drawing Sheet

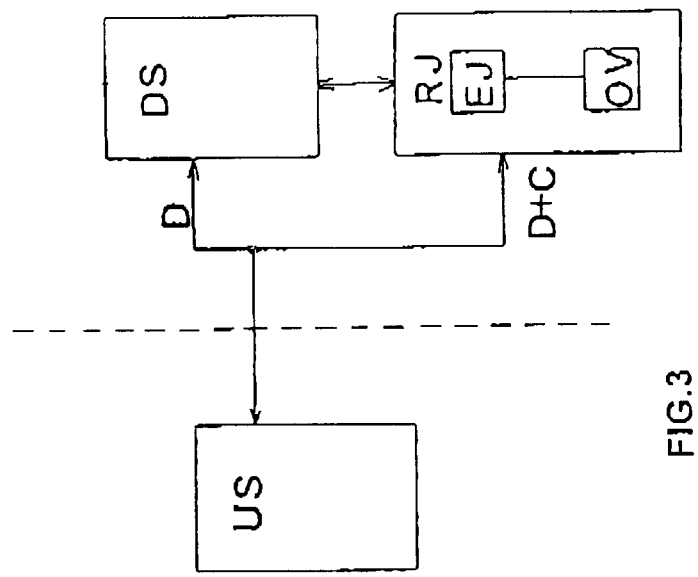
FIG.3
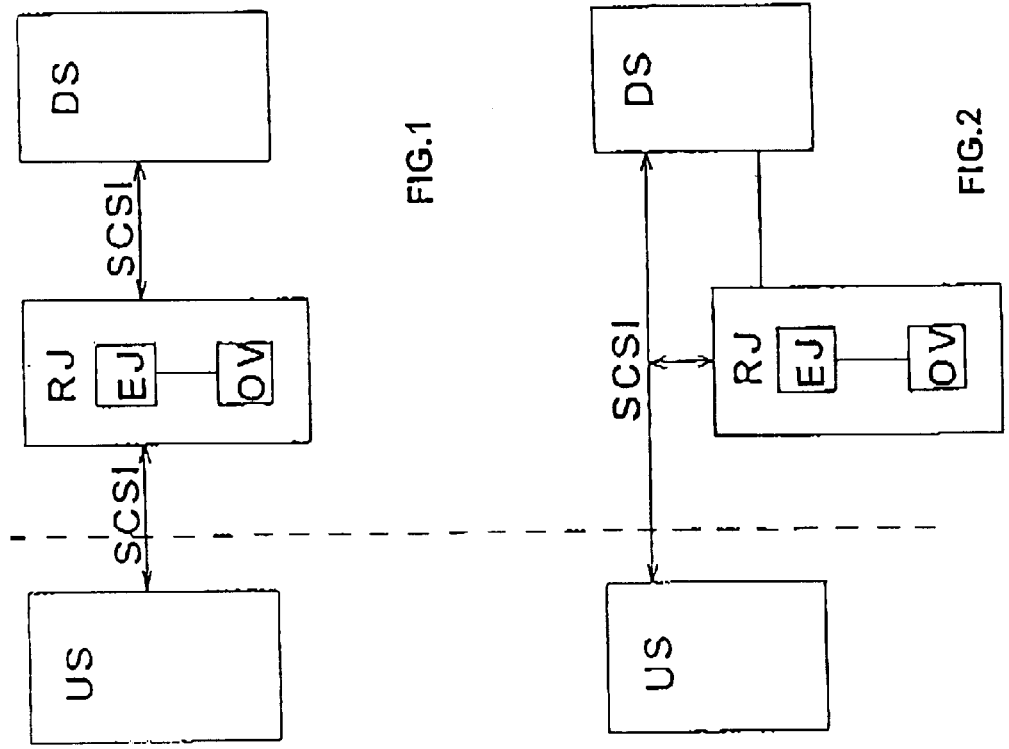
FIG.1
FIG.2

METHOD OF PROTECTING DATA STORED IN THE MEMORY DEVICE OF A COMPUTER SYSTEM AND EQUIPMENT TO CARRY OUT THIS METHOD

FIELD OF THE INVENTION

The invention involves a method of protecting data, stored in the memory device of a computer system, connected to the SCSI interface, against unauthorised access, and equipment for carrying out this method.

DESCRIPTION OF THE PRIOR ART

The protection of data saved in the computer system against unauthorised change or deletion is among the important safeguards in the proposal and implementation of a strategy for protecting information systems. The problem of protection is currently solved partly by means of an operating system partly by use of memory devices of the WORM type (Write Once Read Many, for example recordable CD-ROM) and partly by use of media having the possibility of mechanical blocking of recording (for example, diskettes, tapes, MOD etc.) Normal operating systems protect data by assigning authorisations for recording, readout and execution for each file. These authorisations are assigned only to the owner, group of owners or individual users of the computer system which, given the thousands of files that these systems contain, makes the effective safe dispensing of authorisations extremely difficult. Moreover, an authorisation is valid only for the normal user of a computer system. There is always exists a group of people who, individually or as a team, can have unrestricted access to all the files, and at any given moment may or may not have accreditation by their organisation or the file owner. The system administrators make up this team having unrestricted rights to all the files. However, each owner also has unrestricted access to his own files, which in the case of a database set, for example, can have far-reaching consequences.

Use of memory devices of the WORM type noticeably restricts the possibilities for modification or effacing of individual memories by a systems administrator. Aside for the disadvantages in terms of limited capacity and transmission speed, it is obvious that the system does not guarantee the accuracy of the data and is unsuitable for storing data for the medium term, because during each modification it is necessary to create and change the whole medium.

Use of media with mechanical blocking capacity is complicated by their low capacity (for example diskettes), speed of access to data (for example DAT-type tapes), or by the speed of recording (for example MOD). Also, none of these media guarantees accuracy of the data.

The solution of the above problems must therefore proceed from the following assumptions. Protected data must be reliably protected against change and erasing. Only a small and strictly defined group of users can have the right to record (erase) protected data. It is necessary to ensure reliable and dependable identification of users and an effective method of clear verification of authorised users.

It is not easy to identify in the patent literature, the nearest technical solutions dealing with the given problem. In Czech utility model No. 831, for example, a mechanism is describe for protecting computers against infiltration of unwanted programs and against unacceptable damaging of data. A technical solution is described here which employs the internal bus of the personal computer for communication between the electrical circuit and the software portion. The electrical circuit described comprises a memory circuit, connected across a comparator to a driver. Protection against infiltration of unwanted programs consists here of the fact that a sequence of bytes is transmitted by the program along the internal bus of the computer; these bytes are deposited in the memory circuit and by means of the comparator an evaluation occurs in the electrical circuit of the identity of the bytes transmitted and, depending upon the results, recording onto the hard disk may or may not occur. The arrangement described is limited in its scope to the personal computer, equipped with the appropriate internal bus and is therefore strictly dependent upon the specific type of computer.

SUMMARY OF THE INVENTION

The above objectives of the invention are attained by the method of protecting data, stored in the memory devices of a computer system connected to a SCSI interface, against unauthorised access. The basis of the invention lies in the fact that communication between the computer system and the memory device at the SCSI interface is screened and, depending upon the authorisation of a request, access by the computer system to the memory device is either permitted or refused. Authorisation of a request is by means of identification of an authorised user, access by the computer system to the memory device is in the form of the blocking of any kind of operation with the memory device, or permission to access for memory device readout only, or for readout and recording of data in the memory device, or only for recording of data in the memory device as the case may be. Equipment for carrying out the above method of data protection comprises a memory device connected by the SCSI bus to a host computer system. Between this memory device and the host computer system thee is integrated into the SCSI bus an additional control unit with authorisation block.

The advantage is the clear verification of authorised users, assignment of the right to adjust the control units to a strictly defined individual or a team of authorised users. In contrast to existing protection of data, here it is a question of safe protection of data by hardware means, which cannot be circumvented by any software methods. Identification of authorised users can be made on the basis of very precise prior specifications, for example a combination of any earlier requests (the users alone can chose the degree of security of data protection). At the same time the users can be divided into various groups with authorisation for data readout only or also for recording, and can block all operations as the case may be.

The memory device can consist of a hard disk, a disk subsystem, optical disk, tape unit, re-writable compact disk or electronic memory device. The additional control unit can consist of an electronic control unit, comprising microprocessors or SCSI control units with control software as the case may be. The authorisation block can consist of a lock with mechanical key with contacts, a connector with storage memory device of the EEPROM, EPROM or ROM type, a connector for inserting touch-memory, a chip card or magnetic card scanner, or a user identification scanner as the case may be. The equipment for carrying out the method of protection with a memory device connected by the SCSI bus to the host computer system can comprise, in an alternative embodiment, an additional control unit directly connected to the memory device and connected at the same time to the SCSI bus. On the basis of output from the authorisation block, the electronic unit in the additional control unit directly controls the memory device across the specific interface of the memory device (the disk can be equipped by the manufacturer with a supplementary electronic control, for example blocking of recording or access) and also screens and actuates any control signals from the SCSI. In another embodiment of the invention, the data portion of the SCSI bus can be connected directly to the memory device, while the command portion of the SCSI bus is interrupted by the insertion of an additional control unit, connected to the memory device. As long as the data portion of the SCSI bus between the host computer system and the memory device is not interrupted, the flow of data to the memory device is not slowed down and only the command portion of the SCSI bus is controlled.

BRIEF DESCRIPTION OF THE DRAWINGS

The invention can be more clearly explained by means of the drawings, in conjunction with the following description of concrete embodiments. FIG. 1 is a block diagram showing the arrangement of the equipment for carrying out the data protection method, where between the memory device and the host computer system an additional control unit is inserted into the SCSI bus, to which it is connected or of which is constitutes the authorisation block. In FIG. 2 an additional control unit is directly connected to the memory device and is at the same time connected to the SCSI bus. FIG. 3 shows a further modification of the equipment for carrying out the method of protecting data according to this invention, where the data portion of the SCSI bus is connected directly to the memory device, while the command portion of the SCSI bus is interrupted by the insertion of an additional control unit connected to the memory device.

EXAMPLES OF PREFERRED EMBODIMENTS

FIG. 1 shows the arrangement of one of the possible embodiments of the equipment for carrying out the method of protecting data, stored in the memory device of a computer system connected to a SCSI interface, against unauthorised access. The equipment comprises a memory device DS connected by the SCSI bus to the host computer system US. Between the memory device DS and the host computer system US an additional control unit RJ comprising an electronic unit EJ, to which an authorisation block OV is connected, is integrated into the SCSI bus. The additional control unit RJ monitors the flow of commands from the host computer system US across the SCSI bus and, according to the status of the authorisation block OV, either passes these commands on to the memory device DS or blocks their passage. At the exit from the authorisation block OV a signal occurs establishing the level of access of the host computer system US across the control unit RJ to the memory device DS. Thus for example, by pressing an electronic key (touch memory) at the contact of the authorisation block OV, according to the weight of this key, a signal from the authorisation block OV is given to make the appropriate adjustment to the electronic unit EJ in the control unit RJ, which affects the communication access of the host computer system US, through the control unit RJ, to the memory device DS. Instead of an electronic key, it is possible to use other identifying equipment according to the user's needs, for example, a lock with mechanical key and contacts, fingerprint reader, cornea reader, keyboard, etc. The electronic unit EJ (for example, the microprocessor in the electronic unit EJ) interprets the commands to the SCSI bus. It reacts to the output from the authorisation block OV by transmitting some commands by the SCSI bus to the memory device DS or modifying them (for example, it checks whether the communication to the SCSI bus actually involves the protected memory device DS or another memory device), or it disallows access to the protected memory device DS.

In the case of the modification of the equipment, as illustrated in FIG. 2, the electronic unit EJ in the additional control unit RJ controls the memory device DS directly (for example, a disk is equipped by the manufacturer with a supplementary electronic control, to block recording or access) and also surveys and controls any control signals from the SCSI bus. On the basis of the output from the authorisation block OV, the additional control unit IU controls the memory device DS by means of a specific interface and any control signals from the SCSI bus.

FIG. 3 illustrates further possible alternative embodiments of the equipment for carrying out the method of protecting data according to this invention. The data portion D of the SCSI bus is connected directly here to the memory device DS, while the command portion D+C of the SCSI bus is interrupted by the insertion of an additional command unit RJ, connected to the memory device DS. As long as the data portion of the SCSI bus between the host computer system US and the memory device DS is not interrupted, slowdown in the flow of data to the memory device DS does not occur and only the command portion of the SCSI bus is controlled. For reasons of speed of data transfer from the host computer system US to the memory device DS, the data portion is connected directly to the memory device D and is also connected to the command unit RJ to assure read-out of commands from the SCSI bus.

The specific use of any of the three basic equipment variants described depends on the features of the connected memory device DS, or on the type of SCSI bus used. Thus, for example, the additional control unit RJ including the memory device DS can be situated inside the host computer system US (internal embodiment), can also be situated outside this host computer system US. The advantage is that it is possible to connect them to any host computer system US with an SCSI bus. The additional control unit RJ can contain an enciphering unit for coding data stored in the memory device DS. Any computer with SCSI interface can be a host computer system US.

The technical solution according to the invention as described assures the protection of disk subsystems against unauthorised recording. In a specific embodiment it is possible, by means of contact memory, to switch over to the Read-Write (write enable) mode and the Read-Only (write protect) mode on disk subsystems, and the read and write protect mode as the case may be. In such a case it can consist of a disk subsystem arrangement, electronic key programmer, program equipment and sets of electronic keys. To ensure effective control, operations involving modification of data can be permitted only in the presence of at least two people.

The solution can be completely integrated into the disk subsystem, in which is located a blocking unit (additional control unit) which controls communications on the SCSI bus between the control unit and disk unit. The blocking unit also communicates with the identification chip—contact memory scanners (part of the authorisation block OV).

On the cover of the disk subsystem there are three scanner-openings, into which pin-type jack connectors are inserted. In these connectors are located contact memories. The scanner-openings are moreover located in a locked case on which there is an indicator of the mode of the disk subsystem or of the presence of contact memories. It is possible to switch from the Read-Only mode to the Read-Write mode just by a simultaneous insertion of three, two or one connector from the group of four, five on six which, for the whole period of the Read-Write mode, will be plugged into the openings and locked into the cases. The mode of the changed disk subsystem is indicated on the case by placing a LED diode, for example red for the Read-Write mode and green for the Read-Only mode. The disk subsystem to the whole extent of its capacity, is blocked against recording, in the Read-Only mode. If an attempt is made to record on the disk subsystem in the Read-Only mode, the recording command is refused at the level of the disk subsystem and of the SCSI control unit, and an error report is sent by the SCSI which provokes a corresponding system reaction at the level of the operational system, and also at the applicant level (for example of the database system). The operational system detects transfers in the disk subsystem in the Read-Only mode during connection of the disk as a Write-Protected system (function of the operational system), and thus at the level of the operational system recording on the disk subsystem is already rendered impossible. In the event of penetration of the protection of the operational system, the blocking unit in the Read-Only mode renders recording onto the disk unit physically impossible. It is possible to put the blocking unit out of operation only by removing the disk module from the computer and then dismantling it. Protection against unauthorised changes to the disk therefore depends upon the impossibility of manipulating the inner module.

A contact memory, located in the body of a miniature pin-type connector, serves as a secure identification element (authorisation block OV). From the point of view of the electric signals, connection including attachment is effected by means of two connectors and full communication is ensured against faults by a cyclical code. Each chip has a unique identification code added by the manufacturer so that impossibility of duplication is ensured. It is possible to arrange the contact memories parallel to each other, thus achieving a combination of individual advantages during the current holding, but also an increase in the level of security (thanks to the special algorithm identification of the parallel connected memories).

The additional control unit RJ controls the disk (memory device DS) located in the disk module, so that it is possible to switch between the Read-Only and Read-Write modes, or render the disk inaccessible as the case may be. On the additional control RJ there is a sleeve into which is inserted the electronic key for the unit (authorisation block OV). Any change to this key calls for the dismantling of the disk subsystem. Unless the key is inserted, the control unit blocks the disk and makes it impossible to work with it. The control unit has information stored in the memory device concerning the unique identification of each key that can be inserted into it. A change in this information calls for pre-programming of the control unit. Memories of the Touch Memory type are used as an electronic key, the key being welded and sealed in a cinch-type connector. The basis of the control unit is a single-chip microprocessor, which contains and executes the control program of the unit. Its memory device (for example of the PEROM-type) contains a list of authorised keys and is locked so that it is impossible to read or change it by any hardware means. It is only possible to efface the memory and program again, including the program. The keys have a unique number, each has its weight and identification string information concerning the weight and the string can be programmed by the user. The additional control unit RJ in real time uninterruptedly selects the presence of the keys inserted. The selection process is as follows (in simplified terms). The unit checks whether the identification string of a key is identical and agrees with the string in the control unit. It checks whether the unique number of an individual key is in the list of keys. It calculates the weight of individual keys.

Industrial use

The method of protecting data, stored in the memory device of a computer system connected to an SCSI interface, against unauthorised access, and equipment for carrying out this method according to the invention can be used especially for the protection of primary sources of data (for example database sets), to ensure the consistency of configurational parameters (protection of the software configuration) for protection of files against viruses and Trojan horses and protection of all important data. The method of protection according to the invention is suitable for environments having high protection requirements against change of elimination, either intentional (attacks on the system from outside or within, by hackers or administrators) or accidental; environments such as the banking and finance sectors, the state administration, the army etc.

What is claimed is:

1. A method of protecting data, stored in a memory device of a computer system connected to a SCSI (Small Computer System Interface) interface bus, against unauthorized access, characterized in that:

a control unit having an authorization block is integrated into the SCSI interface bus between the memory device and a SCSI adapter connected to the computer system, said control unit receiving a memory access request control signal from the computer system;

providing an authorization level control signal from said authorization block to said control unit by means of identification of an authorized user;

evaluation said authorization level control signal to screen communication between the computer system and the memory device at the SCSI interface depending upon an authorization level of the memory access request control signal, whereby access by the computer system to the memory device, is either permitted or refused.

2. A device for carrying out the method according to claim 1, comprising:

a memory device (DS) connected to a SCSI bus to a host computer system (US); and an additional control unit (RJ) having an authorization block (OV) having an authorized user identifier connected thereto integrated into the SCSI bus between the memory device and a SCSI adapter connected to the host computer system.

3. A device according to claim 2, characterized in that the memory device (DS) consists of a hard disk, a disk subsystem, optical disk, tape unit, re-writable compact disk or electronic memory device.

4. A device according to claim 3, characterized in that said additional control unit (RJ) is directly connected to the memory (DS) and is connected at the same time to the SCSI bus.

5. A device according to claim 2, characterized in that the additional control unit (RJ) consists of an electronic control unit, comprising microprocessors or SCSI control units with control software.

6. A device according to claim 5, characterized in that said additional control unit (RJ) is directly connected to the memory (DS) and is connected at the same time to the SCSI bus.

7. A device according to claim 2, characterized in that the authorized user identifier comprises: a lock with mechanical key with contacts.

8. A device according to claim 7, characterized in that said additional control unit (RJ) is directly connected to the memory (DS) and is connected at the same time to the SCSI bus.

9. A device according to claim 2, characterized in that said additional control unit (RJ) is directly connected to the memory (DS) and is connected at the same time to the SCSI bus.

10. A device according to claim 2, characterized in that a data portion of the SCSI bus is connected directly to the memory device (DS), while a command portion of the SCSI bus is interrupted by said additional control unit (RJ).

11. The device according to claim 2, characterized in that the authorized user identifier comprises a connector with storage memory of the EEPROM, EPROM or ROM type.

12. The device according to claim 2, characterized in that the authorized user identifier comprises a connector for inserting touch-memory.

13. The device according to claim 2, characterized in that the authorized user identifier comprises a chip card or magnetic card scanner.

14. The device according to claim 2, characterized in that the authorized user identifier comprises a user identification scanner.

15. The method as claimed in claim 1 wherein said control unit further performs the step of blocking of any kind of operation with the memory device.

16. The method as claimed in claim 1 wherein said control unit further performs the step of permitting access to the memory device for memory device readout only.

17. The method as claimed in claim 1 wherein said control unit further performs the step of permitting access to the memory device for readout and recording of data in the memory device.

18. The method as claimed in claim 1 wherein said control unit further performs the step of permitting access to the memory device only for recording of data in the memory device.

* * * * *

UNITED STATES PATENT AND TRADEMARK OFFICE
CERTIFICATE OF CORRECTION

PATENT NO.     : 6,516,999 B1                                    Page 1 of 1
DATED          : February 11, 2003
INVENTOR(S)    : Belonoznik It is certified that error appears in the above-identified patent and that said Letters Patent is hereby corrected as shown below:

<u>Column 6,</u>
Line 37, change "evaluation" to -- evaluating --.
Line 45, change "to a SCSI" to -- by a SCSI --.

Signed and Sealed this

First Day of July, 2003

JAMES E. ROGAN
*Director of the United States Patent and Trademark Office*